United States Patent
Kuo et al.

(10) Patent No.: US 10,499,220 B2
(45) Date of Patent: Dec. 3, 2019

(54) NETWORK CONFIGURATION METHOD AND WIRELESS NETWORKING SYSTEM

(71) Applicant: VIVOTEK INC., New Taipei (TW)

(72) Inventors: Chia-Ming Kuo, New Taipei (TW); Shu-Che Weng, New Taipei (TW)

(73) Assignee: VIVOTEK INC., New Taipei (TW)

( * ) Notice: Subject to any disclaimer, the term of this patent is extended or adjusted under 35 U.S.C. 154(b) by 423 days.

(21) Appl. No.: 14/553,492

(22) Filed: Nov. 25, 2014

(65) Prior Publication Data

US 2015/0195668 A1 Jul. 9, 2015

(30) Foreign Application Priority Data

Jan. 8, 2014 (TW) .............................. 103100715 A (51) Int. Cl.
*H04W 4/50* (2018.01)
*H04W 72/04* (2009.01)

(52) U.S. Cl.
CPC .................................... *H04W 4/50* (2018.02)

(58) Field of Classification Search
CPC ..... H04W 76/02; H04W 84/12; H04W 48/16; H04W 48/20; H04W 72/02; H04W 76/023; H04W 76/06; H04W 12/02; H04W 36/0072; H04W 4/008; H04W 88/06; H04W 8/005; H04W 76/043; H04W 84/18; H04W 88/02; H04W 88/08; H04W 88/12; H04W 74/002; H04W 52/0206; H04W 40/246; H04W 40/24; H04W 76/10; H04W 28/18; H04W 48/18; H04W 12/08; H04W 4/80; H04W 84/20; H04W 24/04; H04W 72/0406; H04L 12/4604; H04L 41/0806; H04L 41/0883; H04L 67/04; H04L 67/303; H04L 2012/2841; H04L 47/14; G06F 3/1236; G06F 21/35
USPC ....... 709/220, 226, 225, 227, 228, 203, 224; 370/252, 254; 455/411
See application file for complete search history.

(56) References Cited

U.S. PATENT DOCUMENTS

| | | | | |
|---|---|---|---|---|
| 8,310,967 B1 * | 11/2012 | Goel | ................ | H04W 52/0206 370/311 |
| 8,339,991 B2 * | 12/2012 | Biswas | ................... | H04L 41/04 370/254 |
| 8,787,222 B2 * | 7/2014 | Yoon | ................... | H04L 43/0811 370/310 |
| 9,137,838 B2 * | 9/2015 | Liu | ...................... | H04W 76/023 |
| 2004/0259529 A1 * | 12/2004 | Suzuki | ................ | H04L 63/0428 455/411 |

(Continued)

*Primary Examiner* — Tonia L Dollinger
*Assistant Examiner* — Linh T. Nguyen
(74) *Attorney, Agent, or Firm* — Maschoff Brennan (57) ABSTRACT

A network configuration method and a wireless networking system utilizing the method are proposed. The proposed method comprises performing a site survey process to search for at least one available wireless network device, obtaining a setting datum corresponding to a wireless access point, selecting one of the available wireless network devices, determining a network connection type corresponding to the selected wireless network device, determining a transferring method according to the corresponding network connection type to transfer the setting datum to the selected wireless network device. The setting datum comprises at least one of a service set identifier (SSID), a wireless encryption method, and a wireless encryption key.

14 Claims, 6 Drawing Sheets

(56) References Cited

U.S. PATENT DOCUMENTS

| | | | |
|---|---|---|---|
| 2006/0259667 A1* | 11/2006 | Kawai | H04L 67/04 710/62 |
| 2007/0140191 A1* | 6/2007 | Kojima | H04W 8/005 370/338 |
| 2007/0146782 A1* | 6/2007 | Lehotsky et al. | G06K 1/00 358/1.15 |
| 2007/0225037 A1* | 9/2007 | Koike | B41J 29/393 455/556.1 |
| 2007/0254614 A1* | 11/2007 | Muralidharan | H04W 12/04 455/307 |
| 2009/0073923 A1* | 3/2009 | Homma | H04W 60/00 370/328 |
| 2009/0257379 A1* | 10/2009 | Robinson et al. | H04M 1/00 370/329 |
| 2010/0015980 A1* | 1/2010 | Seta | H04W 76/02 455/436 |
| 2011/0039494 A1* | 2/2011 | Shon | H04W 8/005 455/41.1 |
| 2011/0162029 A1 | 6/2011 | Huang et al. | |
| 2011/0216692 A1* | 9/2011 | Lundsgaard | H04W 48/20 370/328 |
| 2011/0292925 A1* | 12/2011 | Ho | H04W 88/08 370/338 |
| 2012/0020339 A1* | 1/2012 | Lai | H04W 48/20 370/338 |
| 2012/0026875 A1* | 2/2012 | Narumi | G06F 15/173 370/232 |
| 2012/0077515 A1* | 3/2012 | Oishi | H04W 4/023 455/456.1 |
| 2012/0106496 A1* | 5/2012 | Sakai | H04W 28/18 370/329 |
| 2012/0155385 A1* | 6/2012 | Bencheikh | H04W 48/16 370/328 |
| 2012/0185605 A1* | 7/2012 | Patil | H04W 76/023 709/228 |
| 2012/0246294 A1* | 9/2012 | Eaton | H04W 48/20 709/224 |
| 2012/0257543 A1 | 10/2012 | Baum et al. | |
| 2013/0081121 A1* | 3/2013 | Green | H04L 9/0827 726/7 |
| 2013/0107851 A1* | 5/2013 | Park | H04B 7/026 370/329 |
| 2013/0155839 A1* | 6/2013 | Stein | H04L 43/18 370/216 |
| 2013/0265935 A1* | 10/2013 | Matsuda | H04W 76/02 370/315 |
| 2014/0188985 A1* | 7/2014 | Park | H04L 67/10 709/203 |
| 2016/0037564 A1* | 2/2016 | Borden | H04W 76/10 370/254 |
| 2016/0150373 A1* | 5/2016 | Kim | H04B 7/026 455/456.3 |

* cited by examiner

NETWORK CONFIGURATION METHOD AND WIRELESS NETWORKING SYSTEM

CROSS-REFERENCE TO RELATED APPLICATIONS

This non-provisional application claims priority under 35 U.S.C. § 119(a) on Patent Application No. 103100715 filed in Taiwan, R.O.C on Jan. 8, 2014, the entire contents of which are hereby incorporated by reference.

BACKGROUND OF THE INVENTION

Technical Field of the Invention

The present invention relates to a wireless network configuration method and a wireless networking system, particularly to a wireless network configuration method able to automatically configure a plurality of wireless network devices and a wireless networking system applying the method.

Description of the Related Art

With the advances in wireless network technology, nowadays wireless devices are everywhere, such as wireless IP cameras or wireless household appliances. However, when a user first purchases several wireless IP cameras or wireless household appliances, how to configure these devices to wirelessly connect to a wireless access point for further control and operation is complicated. Conventional approach requires the user to manually perform the configuration device by device. Therefore, how to simplify the complicated configuration process is an urgent problem to be solved.

Even if the user can automatically configure the wireless devices one by one, when there are more wireless devices, the more configuration time is required. If the method of configuring every wireless network device simultaneously utilizing ad-hoc network, such as those disclosed in US patent publication No. 20120257543 and US patent publication No. 20110162029, is adopted, although the overall configuration time can be shortened, but the method is not compatible with the method of configuring the wireless devices one by one.

SUMMARY OF THE INVENTION

Owing to the aforementioned problem, the present invention provides a wireless network configuration method and a wireless networking system applying the method. A wireless network configuration method implemented according to an embodiment of the present invention is for configuring a wireless network device to wirelessly connect to an access point (AP). The method comprises performing a wireless local area network site survey process to search for at least one available wireless network device, obtaining a setting datum corresponding to the AP, selecting one of the at least one available wireless network device, determining a corresponding network connection type according to a network connection type of the selected wireless network device, and determining a transferring method according to the corresponding network connection type to send the setting datum to the selected wireless network device, wherein the setting datum is selected from a group consisting of a wireless service set identifier (SSID), a wireless encryption method, and a wireless encryption key.

A wireless networking system implemented according to one or a plurality of embodiments of the present invention comprises an AP, at least one wireless network device, and a main control device, wherein the AP has a setting datum. Each of the wireless network devices is for operating in a first network connection type when the setting datum is not obtained, and for operating in a second network connection type when the setting datum is obtained and used for wirelessly connecting to the AP, and the first network connection type is different from the second network connection type. The main control device communication connects to the AP and selectively communication connects to at least one wireless network device for performing a wireless local area network site survey to search for at least one available wireless network device. The main control device determines a corresponding network connection type according to the first network connection type of the available wireless network device, and determines a transferring method according to the corresponding network connection type to send the setting datum to the available wireless network device; wherein the setting datum is selected from a group consisting of a wireless SSID, a wireless encryption method, and a wireless encryption key.

According to the wireless network configuration method and the wireless networking system of the present invention, a main control device can automatically determine the network connection type of a wireless network device to decide the corresponding network connection type and transferring method. The main control device can be also used for wirelessly connecting to the wireless network device with the determined corresponding network connection type, and for sending the setting datum of a wireless access point to the wireless network device. After the wireless network device receives the setting datum, the wireless network device wirelessly connects to the AP automatically. Therefore, when a plurality of wireless network devices are needed to be configured, the main control device can automatically determine how to wirelessly connect to each wireless network device, and send the setting datum with unicasting or broadcasting. Then every wireless network device can wirelessly connect to the AP according to the received setting datum automatically.

The contents of the present invention set forth and the embodiments hereinafter are for demonstrating and illustrating the spirit and principles of the present invention, and for providing further explanation of the claims.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
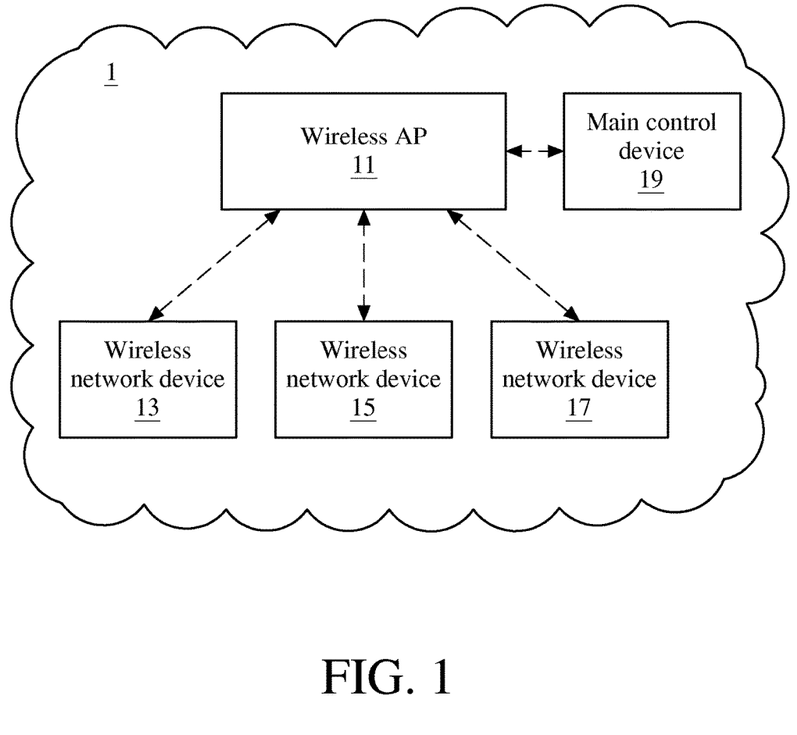
FIG. 1 is a structural diagram of a wireless networking system according to an embodiment of the present invention.

Please refer to FIG. 1. FIG. 1 is a structural diagram of a wireless networking system according to an embodiment of the present invention. As shown in FIG. 1, in an embodiment of the present invention, the wireless networking system 1 includes a wireless access point (AP) 11, at least one wireless network device, such as a wireless network device 13, a wireless network device 15, and a wireless network device 17, and a main control device 19. The wireless networking system 1 is a closed networking system which does not connect to other local area network (LAN), metropolitan area network (MAN), or wide area network (WAN), or a non-closed networking system which wirelessly connect to other networks through the AP 11. The following description explains the function of every device of the wireless networking system 1.

In this embodiment, the AP 11 is the device responsible for transferring data in the whole wireless networking system 1, so that the main control device 19 confirms whether every wireless network device 13, 15, 17 wirelessly connects to the AP 11 correctly after configuring the wireless network device 13, 15, 17. For example, when the main control device 19 wants to send a data request to the wireless network device 13, the main control device 19 wirelessly connects to the AP 11, and then the main control device 19 sends the data request packets to the AP 11. The AP 11 sends the data request packets to the wireless network device 13 according to the target address of the data request packets, such as the address of the wireless network device 13. When the wireless network device 13 receives the data request packets, the wireless network device 13 sends the requested data to the AP 11 in the data packets and the main control device 19 is indicated as the target in the data packets. When the AP 11 receives the data packets indicating to the main control device 19 from the wireless network device 13, the AP 11 sends the data packets to the main control device 19. The details of the test confirmation are further described later.

Figure 2:
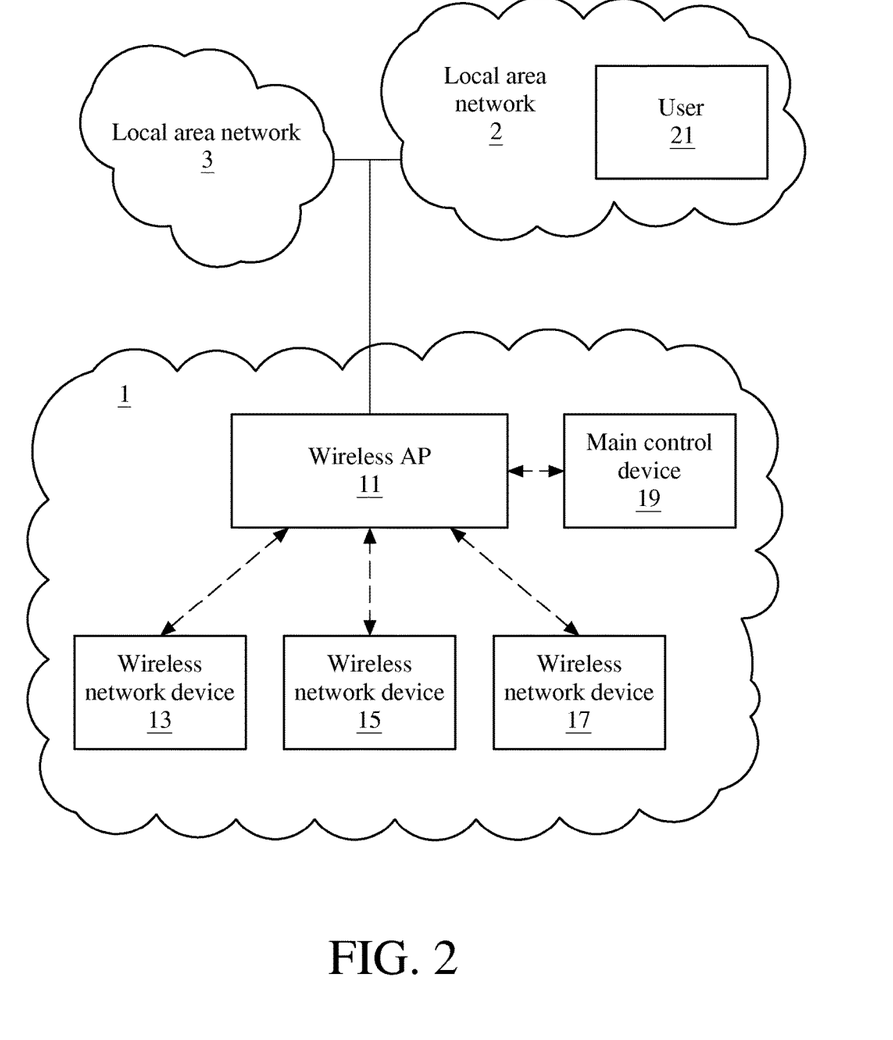
FIG. 2 is a diagram of a wireless networking system interacting with other network systems according to an embodiment of the present invention.

In addition, the AP 11 is also used as a router for the wireless networking system 1 to communicate with other network systems. Please refer to FIG. 2. FIG. 2 is a diagram of a wireless networking system interacting with other network systems according to an embodiment of the present invention. As shown in FIG. 2, the wireless networking system 1, and/or other devices, wirelessly connects to a LAN 2 and a LAN 3 through an AP. When a user 21 belonging to the LAN 2 wants to obtain the data of the wireless network device 15, the user 21 sends data request packets to the wireless networking system 1, and when the AP 11 receives the data request packets, the AP 11 determines the data request packets need to be sent to the wireless network device 15. Therefore, the AP 11 passes the data request packets to the wireless network device 15, and then the wireless network device 15 receives the data request packets and gives a corresponding response.

Generally, the AP 11 has one or a plurality of setting data. The setting datum of the AP 11 is selected from a group consisting of a wireless service set identifier (SSID), a wireless encryption method, and a wireless encryption key. The wireless encryption method is wireless encryption protocol (WEP, also known as wired equivalent privacy), wireless fidelity protected access (WPA, also known as Wi-Fi protected access), or any other suitable wireless encryption method.

Figure 3:
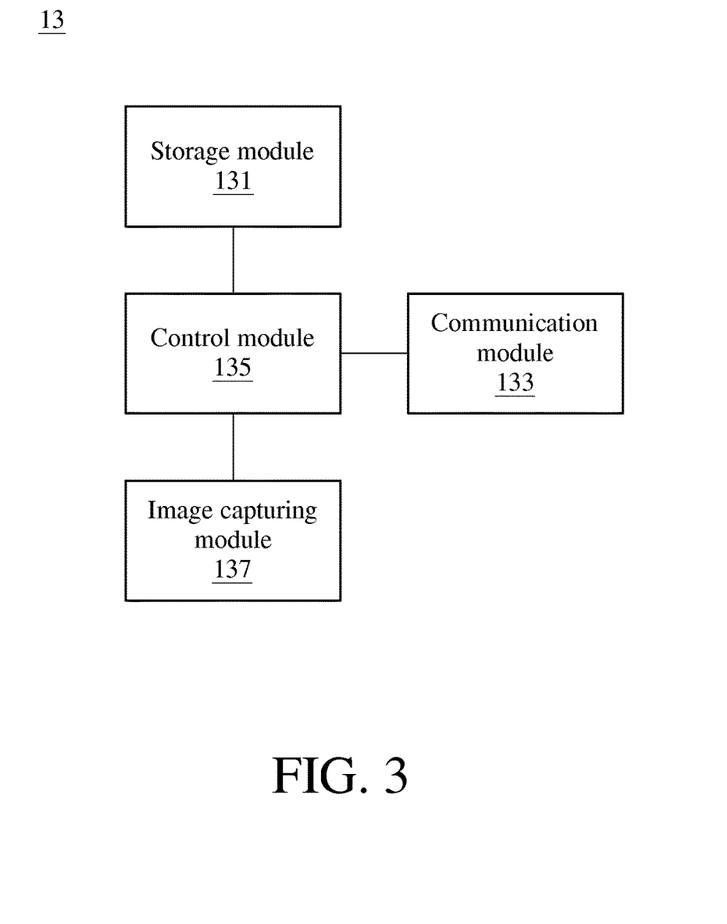
FIG. 3 is a functional block diagram of a wireless network device according to an embodiment of the present invention.

The following takes the wireless network device 13 for example to describe the operation of the wireless network device 13, the wireless network device 15, and the wireless network device 17. Please refer to FIG. 3. FIG. 3 is a functional block diagram of a wireless network device according to an embodiment of the present invention. As shown in FIG. 3, the wireless network device 13 includes a communication module 133, a storage module 131, and a control module 135. The control module 135 is electrically connected to the communication module 133 and the storage module 131 respectively.

The storage module 131 is for data storage. For example, the wireless network device 13 is an IP (Internet Protocol) camera, and the data stored in the storage module 131 includes the static image data or dynamic video stream captured by the wireless network device 13. In addition, the storage module 131 stores one or a plurality of setting data and the setting datum is for the wireless network device 13 to wirelessly connect to a certain AP, such as the AP 11. The storage module 131 includes at least one non-volatile storage media, such as a hard disk drive, electronic erasable programmable read only memory (EEPROM), magnetic tape, or any other non-transitory storage medium for data storage, and the present invention does not have any limitation.

The communication module 133 is for the wireless network device 13 to wirelessly connect to the AP 11 or the main control device 19. For example, the communication module 133 is operated in station mode, and the wireless network device 13 wirelessly connects to the AP 11 through the communication module 133. In another example, the communication module 133 is operated in access point mode (AP mode), so that the main control device 19 is operated in station mode and wirelessly connect to the wireless network device 13. In a further example, the communication module 133 is also operated in ad hoc mode, so that the wireless network device 13 joins an ad hoc network, and other devices belonging to the ad hoc network sends packets to the wireless network device 13, such as the main control device 19 that also joins the ad hoc network, and vice versa. According to the spirit of the present invention, the communication module is a device following the 802.11a/b/g/n or other wireless communication standards, and the present invention does not have any limitation.

The control module 135 is for controlling the storage module 131 and the communication module 133. In an embodiment of the present invention, after the wireless network device 13 is enabled (or activated), the control module 135 first determines whether the setting datum is stored in the storage module 131 or not. If yes, the wireless network device 13 is configured already, and the wireless network device 13 controls the communication module 133 to operate in station mode and to wirelessly connect to the AP 11 according to the setting datum stored in the storage module 131. If the control module 135 determines that storage module 131 does not store the setting datum, which means the wireless network device 13 is not configured yet, the control module 135 controls the communication module 133 to operate in access point mode or ad hoc mode, so that the main control device 19 wirelessly connects to the wireless network device 13 for configuring. In an embodiment of the present invention, when the wireless network device 13 is enabled and the control module 135 determines that the storage module 131 does not store the setting datum, the control module 135 controls the communication module 133 to operate in access point mode or ad hoc mode depending on a factory setting different from the said setting datum.

Meanwhile, the control module 135 controls the communication module 133 to send network beacons continuously, and the network beacon includes the information available to distinguish whether the communication module 133 is operating in access point mode or ad hoc mode. If the communication module 133 operates in access point mode or ad hoc mode, the communication module 133 receives one or a plurality of setting data sent from the main control device 19, so that the control module 135 stores the setting datum in the storage module 131, and the control module 135 controls the communication module 133 to operate in station mode and wirelessly connects to the AP 11 with the received setting datum. According to the spirit of the present invention, the control module 135 is an application-specific integrated circuit (ASIC), advanced RISC machine (ARM), central processing unit (CPU), single chip controller, or any other device suitable for executing arithmetic and controlling instructions. The present invention does not have any limitation.

In an embodiment, as shown in FIG. 3, the wireless network device 13 further includes an image capturing module 137, and the image capturing module 137 is electrically connected to the control module 135. In addition, the image capturing module 137 is controlled by the control module 135 and captures static images or dynamic video stream, of a specific area in the environment that the wireless network device 13 locates in. The captured static images or dynamic video stream are stored in the storage module 131 through the control module 135. According to the spirit of the present invention, the image capturing module 137 is an infrared camera, a visible light camera, or any other device able to capture the image of a specific area, and the present invention does not have any limitation.

In summary, the wireless network device 13 operates in the first network connection type, or in other words, the communication module 133 operates in access point mode or ad hoc mode, to receive one or a plurality of setting data in association with the AP 11. The wireless network device 13 also operates in the second network connection type after obtaining the said setting datum, or in other words, the communication module 133 operates in station mode, and wirelessly connect to the AP 11 with the said setting datum. According to the spirit of the present invention, the wireless network device 13 is a wireless IP camera, wireless household appliance, or any other wireless electronic consuming product. The present invention does not have any limitation.

Please go back to FIG. 1. The main control device 19 is for performing a wireless local area network site survey process to receive a plurality of network beacons passively or to collect probe responses by sending probe requests actively, and determining available wireless network devices according to these network beacons or probe responses, and selecting at least one of the available wireless network devices as the wireless network device for setting. According to the previous embodiment of the present invention, the wireless network device 13, 15, 17 that is wirelessly connected by the main control device 19 are surely operating in the first network connection type, so that the main control device 19 determines the corresponding network connection type for operating depending on whether the first network connection type of the selected wireless network device is in access point mode or ad hoc mode.

For example, after the main control device 19 performs the wireless local area network site survey process, because a plurality of the network beacons or probe responses are collected, the main control device 19 further determines that the AP 11, the wireless network device 13, the wireless network device 15, and the wireless network device 17 are available for wirelessly connecting according to the network beacons or probe responses. The process running on the main control device 19 determines which devices support the configuration method of the present invention according to the identifier of the wireless network device, such as Media Access Control Address, MAC address, in the received network beacons or probe responses, such as the wireless network device 13, the wireless network device 15, and the wireless network device 17. The wireless network device available for configuring is listed in the graphical user interface (GUI) for the user to select, such as selecting the wireless network device 13. Meanwhile, the main control device 19 applies the conventional method to determine whether the first network connection type operating in the wireless network device 13 is access point mode or ad hoc mode according to the network beacon or probe response from the wireless network device 13.

If the first network connection type operated in the wireless network device 13 is access point mode, the main control device 19 has to operate in station mode to wirelessly connect to the wireless network device 13, so currently the corresponding network connection type is station mode. On the contrary, if the first network connection type operated in the wireless network device 13 is ad hoc mode, the main control device 19 has to operate in ad hoc mode to wirelessly connect to the wireless network device 13, so currently the corresponding network connection type is ad hoc mode.

After the main control device 19 determines the corresponding network connection type, the main control device 19 wirelessly connects to the wireless network device 13 with the corresponding network connection type. Then the main control device 19 determines a transferring method according to the corresponding network connection type and sends the setting datum of the AP 11 to the wireless network device 13 by the determined transferring method. If the corresponding network connection type is station mode, after the main control device 19 wirelessly connects to the wireless network device 13 in station mode, the main control device 19 sends the setting datum to the wireless network device 13 with unicast transmission of transfer control protocol and internet protocol (TCP/IP). If the corresponding network connection type is ad hoc mode, the main control device 19 wirelessly connects to an ad hoc network including the wireless network device 13 in ad hoc mode, and broadcasts the setting datum in the said ad hoc network based on user datagram protocol (UDP) or TCP over UDP.

Next, how the main control device 19 obtains the setting datum of the AP 11 is explained in the following description. Because the user wants to configure the wireless network device to wirelessly connect to the AP, the user must know the setting datum of the AP 11. Specifically, the setting datum includes a wireless SSID, a wireless encryption method, and a wireless encryption key, wherein the wireless SSID and the wireless encryption method is obtained by performing another site survey process or by the previous mentioned wireless local area network site survey process. The main control device 19 shows the obtained wireless SSID and wireless encryption method of the AP 11 in the GUI for users to select, or the user keys in the SSID and corresponding wireless encryption method of the AP 11 through the GUI provided by the main control device 19. The wireless encryption key is also keyed in by the user. According to the spirit of the present invention, the main control device 19 is mobile phone, remote controller, or any other device able to wirelessly connect to the wireless network device through wireless technology. The present invention does not have any limitation.

Figure 4:
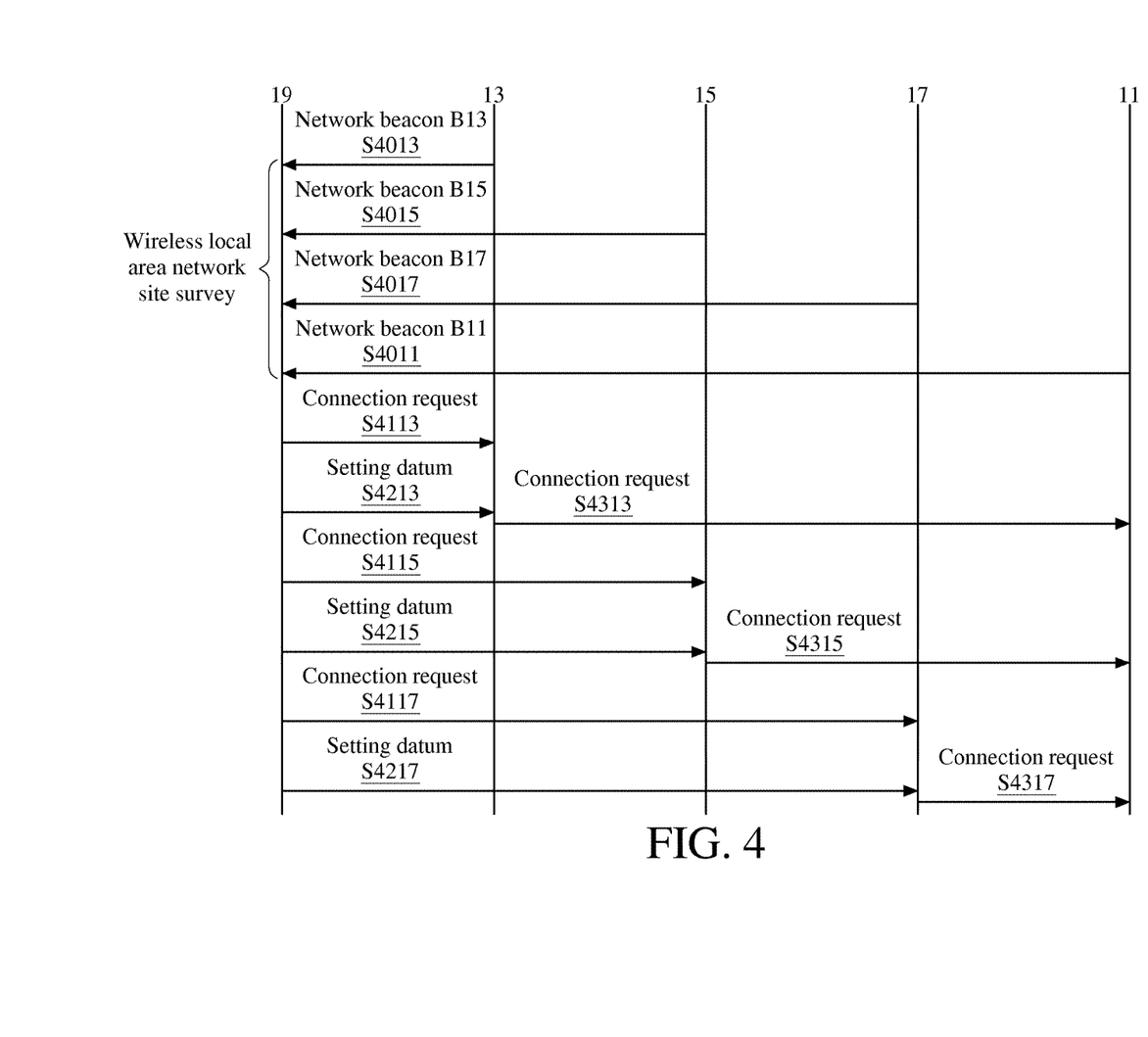
FIG. 4 is an operational process diagram of a wireless networking system according to an embodiment of the present invention.

In association with an embodiment of the present invention, how the said three kinds of device, such as the AP 11, the wireless network device 13, 15, 17, and the main control device 19, interact to achieve the goal of the present invention, please refer to FIG. 4. FIG. 4 is an operational process diagram of a wireless networking system according to an embodiment of the present invention. As shown in FIG. 4, the wireless networking system includes an AP 11, a wireless network device 13, a wireless network device 15, a wireless network device 15, and a main control device 19. In the present embodiment, assuming that the wireless network device 13, the wireless network device 15, and the wireless network device 17 operate in access point mode, first the main control device 19 performs a wireless local area network site survey process to search for available wireless network devices. Meanwhile, the AP 11 sends a network beacon B11 (the step S4011), the wireless network device 13 sends a network beacon B13 (the step S4013), the wireless network device 15 sends a network beacon B15 (the step S4015), and the wireless network device 17 sends a network beacon B17 (the step S4017). The main control device 19 knows that the available wireless network devices are the wireless network device 13, 15, and 17 by determining the MAC addresses in the network beacons.

Then if the user wants to configure all of the three wireless network devices, because these three wireless network devices all operate in access point mode, the main control device 19 has to operate in station mode corresponding to access point mode when wirelessly connecting to any of the wireless network devices. Of course, configuring only one of the wireless network devices is also available. And of course, configuring only two of the wireless network devices is also available. The main control device 19 sends a connection request to the wireless network device 13 (the step S4113) in order to wirelessly connect to the wireless network device 13, and then sends the setting datum of the AP 11 to the wireless network device 13 when the connection is successfully built (the step S4213). After the wireless network device 13 receives the setting datum, the wireless network device 13 changes the network connection type and operate in station mode, and send a connection request to the AP 11 according to the setting datum (the step S4313).

When the wireless network device 13 is operating in station mode, the main control device 19 loses the connection to the wireless network device 13. Then the main control device 19 sends a connection request to the wireless network device 15 (the step S4115) to wirelessly connect to the wireless network device 15, and sends the setting datum of the AP 11 to the wireless network device 15 after the connection is successfully built (the step S4215). After the wireless network device 15 receives the setting datum, the wireless network device 15 changes the network connection type and operate in station mode and send a connection request to the AP 11 according to the setting datum (the step S4315).

When the wireless network device 15 is operating in station mode, the main control device 19 loses the connection to the wireless network device 15. Then the main control device 19 sends a connection request to the wireless network device 17 (the step S4117) to wirelessly connect to the wireless network device 17, and sends the setting datum of the AP 11 to the wireless network device 17 after the connection is successfully built (the step S4217). After the wireless network device 17 receives the setting datum, the wireless network device 17 changes the network connection type and operate in station mode and send a connection request to the AP 11 according to the setting datum (the step S4317).

In the aforementioned process, the main control device 19 sequentially wirelessly connects to the wireless network device 13, the wireless network device 15, and the wireless network device 17 and sends the setting datum of the AP 11. The order of the connections and sending the setting datum is arranged according to the sequence of the MAC addresses of the wireless network devices. However, the present invention does not have any limitation.

Figure 5:
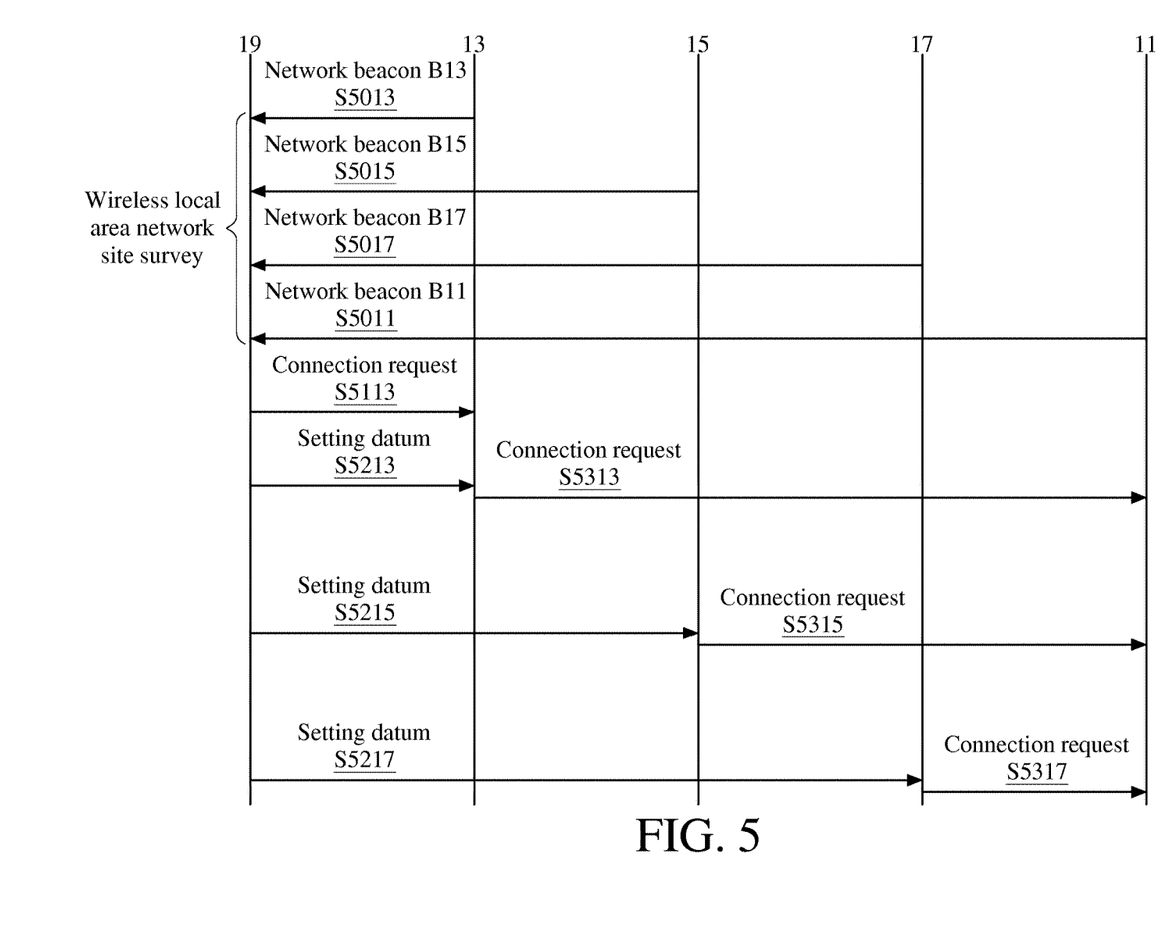
FIG. 5 is an operational process diagram of a wireless networking system according to an embodiment of the present invention.

In association with another embodiment of the present invention, how the said three kinds of device, such as the AP 11, the wireless network device 13, 15, 17, and the main control device 19, interact to achieve the goal of the present invention, please refer to FIG. 5. FIG. 5 is an operational process diagram of a wireless networking system according to an embodiment of the present invention. As shown in FIG. 5, the wireless networking system includes an AP 11, a wireless network device 13, a wireless network device 15, a wireless network device 17, and a main control device 19. In the beginning, the wireless network device 13, the wireless network device 15, and the wireless network device 17 are not configured and operate in ad hoc mode. Assuming that the wireless network device 13, 15, and 17 are located within the available scope of transmission signal with each other, because the present invention requires all wireless network devices operating in ad hoc mode to use the same ad hoc network wireless SSID, the wireless network device 13, 15, and 17 belong to the same ad hoc network. First, the main control device 19 performs a wireless local area network site survey process to search for available wireless network devices. Meanwhile, the AP 11 sends a network beacon B11 (the step S5011), the wireless network device 13 sends a network beacon B13 (the step S5013), the wireless network device 15 sends a network beacon B15 (the step S5015), and the wireless network device 17 sends a network beacon B17 (the step S5017). The main control device 19 knows that the available wireless network devices are the wireless network device 13, 15, and 17 by determining the MAC addresses in the network beacons.

Then if the user wants to configure all of the three wireless network devices, because these three wireless network devices all operate in ad hoc mode, the main control device 19 has to operate in ad hoc mode when wirelessly connecting to any of the wireless network devices. Of course, configuring only one of the wireless network devices is also available. And of course, configuring only two of the wireless network devices is also available. The main control device 19 changes the network connection type and operates in ad hoc mode, and uses the same default ad hoc network wireless SSID as the wireless network device 13, 15, and 17 have to join the ad hoc network comprising the plurality of wireless network devices. After the connection is successfully built, the setting datum of the AP 11 is sent to the wireless network device 13 (the step S5213), the wireless network device 15 (the step S5215), and the wireless network device 17 (the step S5217) by broadcasting. Please be noted that there is only one broadcast packet although it is described with three steps here. Of course, the setting datum can be separated in many broadcasting packets and can be broadcasted once or many times. The present invention does not have any limitation.

After the wireless network device 13 receives the setting datum, the wireless network device 13 changes the network connection type and operates in station mode, and sends a connection request to the AP 11 according to the setting datum (the step S5313). After the wireless network device 15 receives the setting datum, the wireless network device 15 changes the network connection type and operates in station mode, and send a connection request to the AP 11 according to the setting datum (the step S5315). After the wireless network device 17 receives the setting datum, the wireless network device 17 changes the network connection type and operates in station mode, and send a connection request to the AP 11 according to the setting datum (the step S5317).

When the wireless network device 13, the wireless network device 15, the wireless network device 17 and the main control device 19 forms or joins an ad hoc network, and if every device uses a default IP address, address collision possibly happens. In order to avoid address collision or to reduce the possibility of address collision, every device, such as the wireless network device or the main control device, uses its own MAC address to generate a set of numbers (X,Y) according to a hash function, sets its own IP address to a link local address 169.254.X.Y, and joins the ad hoc network with this link local address, wherein X is an integer between 0 and 255, and Y is also an integer between 0 and 255. The possibility of address collision happened in the generated link local addresses is very small because the MAC address of every device is different.

In another embodiment of the present invention, if the selected wireless network device that needs to be configured includes two network connection types, for example, the wireless network device 13, 15, and 17 are selected, wherein 13 operates in access point mode, and 15 and 17 operate in ad hoc mode. Therefore, the main control device 19 first wirelessly connects to the wireless network device 13 for configuring in station mode, as shown in FIG. 4, and then, as shown in FIG. 5, further wirelessly connects to the wireless network device 15 and 17 for configuring in ad hoc mode. Alternatively, the main control device 19 first wirelessly connects to the wireless network device 15 and 17 for configuring in ad hoc mode, as shown in FIG. 5, and then, as shown in FIG. 4, further wirelessly connects to the wireless network device 13 for configuring in station mode.

In an embodiment of the present invention, when the main control device 19 already sends the setting datum of the AP 11 to all of the selected wireless network devices, the main control device 19 further wirelessly connects to the AP 11 according to the setting datum to join the wireless networking system 1. Next, the main control device 19 queries the AP 11 about the current wirelessly connected devices to confirm whether every selected wireless network device wirelessly connects to the AP 11 successfully. Assuming that the selected wireless network devices include the wireless network device 15, the main control device 19 queries the AP 11 and finds out that the wireless network device 15 does not wirelessly connect to the AP, and then in an embodiment, the main control device 19 disconnects the AP 11 and tries to wirelessly connect to the wireless network device 15 for sending the setting datum of the AP 11 to the wireless network device 15 again. In another embodiment, the main control device 19 sends warning signals to the user, such as alarming or showing a certain image on the screen.

In another embodiment of the present invention, when the main control device 19 wants to confirm whether every selected wireless network device wirelessly connects to the AP 11 correctly, the main control device 19 wirelessly connects to the AP 11 and broadcasts a well-known or proprietary application discovery/response message (DRM) request. In addition, the DRM includes the IP address of the main control device 19. The broadcast packet is sent out through the AP 11. The wireless network device not wirelessly connecting to the AP 11 cannot receive this DRM because the DRM is an application layer packet of the wireless infrastructure network formed by the AP 11.

Every wireless network device that receives the DRM and supports the present invention responds to the DRM and sends a corresponding DRM reply to the main control device 19 through the AP 11. The DRM sent by the wireless network device includes the MAC address of the wireless network device sending the signal, so that when the main control device 19 receives the DRMs coming from a plurality of wireless network devices, the main control device 19 examines the MAC address of every DRM to confirm whether every selected wireless network device to be configured wirelessly connects to the AP 11 correctly.

Figure 6:
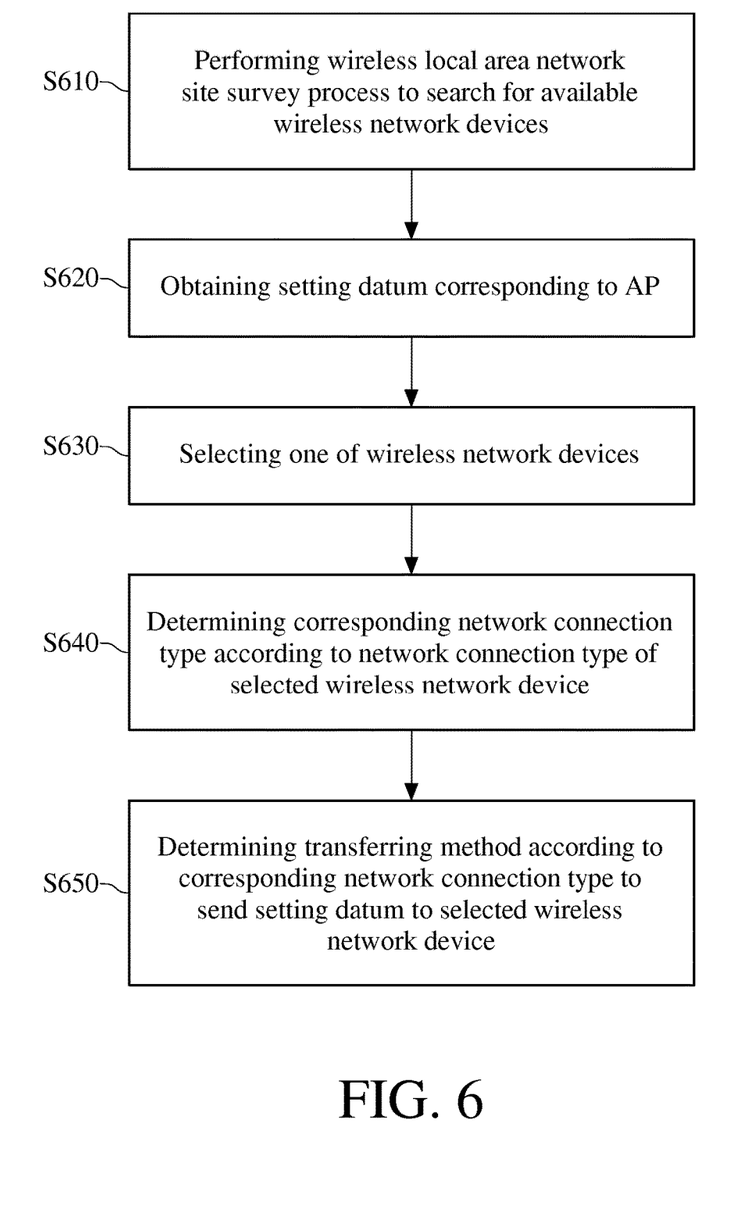
FIG. 6 is flow chart of a wireless network configuration method according to an embodiment of the present invention.

In association with an embodiment of the present invention for the wireless network configuration method, please refer to FIG. 1 to FIG. 6 and the above explanation of the wireless networking system together. FIG. 6 is flow chart of a wireless network configuration method according to an embodiment of the present invention. As shown in the step S610, the main control device 19 performs a wireless local area network site survey process to search for available wireless network devices. As shown in the step S620, the main control device 19 obtains the setting datum of the AP 11. As shown in the step S630, the main control device 19 selects one or a plurality of the wireless network devices. As shown in the step S640, the main control device 19 determines the corresponding network connection type according to the network connection type of the selected wireless network device. As shown in the step S650, the main control device 19 determines the transferring method according to the corresponding network connection type to send the setting datum to the selected wireless network device. When the selected wireless network device receives the setting datum, the selected wireless network device wirelessly connects to the AP 11 according to the setting datum.

According to the wireless network configuration method and the wireless networking system of the present invention, a main control device automatically determines the network connection type of a wireless network device and determines the corresponding network connection type and the transferring method. The main control device wirelessly connects to the wireless network device with the determined corresponding network connection type and further sends the setting datum of an AP to the wireless network device with the determined transferring method. After the wireless network device receives the setting datum, the wireless network device wirelessly connects to the AP automatically. Therefore, when a plurality of wireless network devices need to be configured, the main control device automatically determines how to wirelessly connect to each wireless network device for sending the setting datum of the AP. Each wireless network device needed to be configured automatically wirelessly connects to the AP according to the received setting datum.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A wireless network configuration method for configuring multiple wireless network devices to wirelessly connect to an access point (AP), comprising:
   by a main control device, performing a wireless local area network site survey process to receive a MAC address in network beacons or to collect the MAC address in probe responses by sending probe requests actively, and to determine multiple available wireless network devices among the multiple wireless network devices according to the MAC address in the network beacons or probe responses;
   by the main control device, obtaining a setting datum corresponding to the AP;
   by the main control device, selecting at least two of the multiple available wireless network devices according to the MAC address in the network beacons or probe responses;
   by the main control device, determining a corresponding network connection type according to a network connection type of the selected wireless network devices; and
   by the main control device, determining a transferring method according to the corresponding network connection type to connect to the selected wireless network devices and to send the setting datum to the selected wireless network devices;
   wherein the setting datum is selected from a group consisting of a wireless service set identifier (SSID), a wireless encryption method, and a wireless encryption key,
   wherein in the step of determining a corresponding network connection type according to a network connection type of the selected wireless network devices comprising: if the network connection type is ad hoc, the corresponding network connection type is ad hoc, and if the network connection type is access point (AP), the corresponding network connection type is station (STA),
   wherein the main control device confirms whether each of the selected wireless network devices wirelessly connects to the access point correctly according a discovery/response message (DRM) request, the main control device wirelessly connects to the access point and the access point broadcasts the DRM request, the DRM includes an IP address of the main control device, and only the selected wireless network device correctly connecting to the access point receives the DRM request.

2. The wireless network configuration method of claim 1, wherein the step of determining a transferring method according to the corresponding network connection type to send the setting datum to the selected wireless network devices comprises:
   joining an ad hoc network including the selected wireless network devices and broadcasting the setting datum if the corresponding network connection type is ad hoc; and
   wirelessly connecting to the selected wireless network devices and sending the setting datum to the selected wireless network devices if the corresponding network connection type is STA.

3. The wireless network configuration method of claim 2, wherein the step of broadcasting the setting datum is implemented based on transmission control protocol (TCP) over user datagram protocol (UDP) to broadcast the setting datum.

4. The wireless network configuration method of claim 1, further comprising:
   sending a confirm message from the AP to the selected wireless network devices to confirm whether the selected wireless network devices are wirelessly connected to the AP successfully.

5. A wireless networking system, comprising:
   an AP having a setting datum;
   multiple wireless network devices, wherein each of the multiple wireless network devices is for operating in a first network connection type when the setting datum is not obtained, and for operating in a second network connection type when the setting datum is obtained and used for wirelessly connecting to the AP, and the first network connection type is different from the second network connection type; and
   a main control device communication connecting to the AP and controlling the AP, for performing a wireless local area network site survey to receive a MAC address in network beacons or to collect the MAC address in probe responses by sending probe requests actively, and to determine multiple available wireless network devices among the multiple wireless network devices according to the MAC address in the network beacons or probe responses, selecting at least two of the multiple available wireless network devices according to the MAC address in the network beacons or probe responses and determining a corresponding network connection type according to the first network connection type of the selected wireless network devices, and determining a transferring method according to the corresponding network connection type to connect to the selected wireless network devices and to send the setting datum to the selected wireless network devices;
   wherein the setting datum is selected from a group consisting of a wireless service set identifier (SSID), a wireless encryption method, and a wireless encryption key, and
   wherein when the main control device determines the corresponding network connection type according to the first network connection type of the selected wireless network devices, if the first network connection type is ad hoc, the corresponding network connection type is ad hoc, and if the first network connection type is access point (AP), the corresponding network connection type is station (STA),
   wherein the main control device confirms whether each of the selected wireless network devices wirelessly connects to the access point correctly according a discovery/response message (DRM) request, the main control device wirelessly connects to the access point and the access point broadcasts the DRM request, the DRM includes an IP address of the main control device, and only the selected wireless network device correctly connecting to the access point receives the DRM request.

6. The wireless networking system of claim 5, wherein the main control device determining a transferring method according to the corresponding network connection type to send the setting datum to the selected wireless network devices comprises:
    joining an ad hoc network including the selected wireless network devices and broadcasting the setting datum if the corresponding network connection type is ad hoc; and
    wirelessly connecting to the selected wireless network devices and sending the setting datum to the selected wireless network devices if the corresponding network connection type is STA.

7. The wireless networking system of claim 6, wherein when the main control device broadcasts the setting datum, transmission control protocol (TCP) over user datagram protocol (UDP) is implemented to broadcast the setting datum.

8. The wireless networking system of claim 5, the main control device further sends a confirm message from the AP to the selected wireless network devices to confirm whether the selected wireless network devices are wirelessly connected to the AP successfully.

9. The wireless network configuration method of claim 2, wherein when the network connection type is AP mode, the corresponding network connection type is station (STA) so that the main control device wirelessly connects to the selected wireless network devices directly without via the AP.

10. The wireless networking system of claim 6, wherein when the network connection type is AP mode, the corresponding network connection type is station (STA) so that the main control device wirelessly connects to the selected wireless network devices directly without via the AP.

11. The wireless network configuration method of claim 1, further comprising:
    by the main control device, connecting to the AP according to the setting datum;
    by the main control device, determining whether the selected wireless network devices wirelessly connect to the AP by querying the AP; and
    by the main control device, disconnecting the AP and attempting to connect to the selected wireless network devices for resending the setting datum to the selected wireless network devices.

12. The wireless network configuration method of claim 1, further comprising:
    by the selected wireless network devices or the main control device, using the MAC address to generate a set of numbers according to a hash function; and
    by the selected wireless network devices or the main control device, setting an IP address to be a link local address for joining an ad hoc network;
    wherein the link local address comprises the set of numbers.

13. The wireless networking system of claim 5, wherein the main control device connects to the AP according to the setting datum and determines whether the selected wireless network devices wirelessly connect to the AP by querying the AP, and the main control device further disconnects the AP and attempts to connect to the selected wireless network device for resending the setting datum to the selected wireless network devices.

14. The wireless networking system of claim 5, wherein the selected wireless network devices or the main control device uses the MAC address to generate a set of numbers according to a hash function, and sets an IP address to be a link local address for joining an ad hoc network, wherein the link local address comprises the set of numbers.

* * * * *